No. 739,964. PATENTED SEPT. 29, 1903.
A. E. WHITE & J. J. EVANS.
COMBINED MENU CARD AND MEAL AND PAY CHECK.
APPLICATION FILED OCT. 16, 1902.
NO MODEL.

Witnesses
Samuel W. Banning.
Oscar W. Bond

Inventors
Arthur E. White.
John J. Evans.
By Banning & Banning
Attys.

No. 739,964.

Patented September 29, 1903.

UNITED STATES PATENT OFFICE.

ARTHUR E. WHITE, OF CHICAGO, AND JOHN J. EVANS, OF WEST GROSSDALE, ILLINOIS.

COMBINED MENU-CARD AND MEAL AND PAY CHECK.

SPECIFICATION forming part of Letters Patent No. 739,964, dated September 29, 1903.

Application filed October 16, 1902. Serial No. 127,489. (No model.)

*To all whom it may concern:*

Be it known that we, ARTHUR E. WHITE, residing at Chicago, and JOHN J. EVANS, residing at West Grossdale, in the county of Cook and State of Illinois, citizens of the United States, have invented certain new and useful Improvements in Menu-Cards and Meal and Pay Checks, of which the following is a specification.

This invention relates more particularly to menu-cards and checks designed or intended for use in hotels, restaurants, and dining-rooms generally where meals are supplied à la carte and on steamboats and railway dining-cars; but as to some of its characteristics it is adapted for use as a bill of fare or menu-card for general use.

The primary object of the invention is to provide a menu-card the body of which contains a bill of fare and which will also form an audit-check when turned in to the cashier, auditor, or other receiver, and combining with the body of the card a detachable check for deposit with the cook or other person designated to receive the same and a detachable check for presentation to the customer in paying the bill.

A further object is a provision for enabling the customer to indicate on the bill of fare such articles as may be desired, enabling the cost of each article to be observed at the time of ordering and indicating it and enabling the manager, conductor, or other authorized party to calculate the amount of the ordered meal and punch the same on the menu-card and also on the two detachable checks, thereby preventing fraud or manipulation in changing the amount of the bill; and the invention consists in the features of construction, arrangement, and combination of parts hereinafter described and claimed.

In the drawings, Figure 1 is a front or face view of the card and checks as issued for use; Fig. 2, a front or face view of the card, showing the articles ordered and the cost thereof punched out on the body of the card and showing one of the checks turned under and both checks punched for the amount of the total cost of the meal, as indicated by the total amount on the body of the card or bill of fare; and Fig. 3, a front or face view of the body of the card or bill of fare, as in Fig. 2, with both checks detached and punched, as in Fig. 2.

The menu-card or bill of fare of the present invention consists of a main or body card A, having printed on its face a bill of fare comprising the articles which can be ordered and served, the articles being printed on the front or face of the body of the card in lines, as indicated by *a*, and before each article and in line therewith is a circle or square or other inclosed space *a'*, in which the guest indicates the article or articles ordered by placing an "X" or other indicating-mark in the space. Each article has the price thereof indicated on the card, preferably at the end of the line giving the name of the article, and on one side of the body of the card is a space B, lined off and having in one of the lines a column of figures *b*, corresponding to the prices of the articles, and preferably the figures in the column *b* are in line with the articles and correspond in amount to the price of the articles, and, in addition, spaces are provided, indicated by circles or otherwise, for punching out the number of articles ordered at a given price.

At the bottom of the main or body portion of the card or bill of fare and detachably connected thereto by a perforated line *e* is a check C, having on its front face a lined space divided into three series, one of which, *c*, has numerals for indicating dollars from "1" to "9" preferably, and the other two series, *c'*, of which have numerals indicating cents from "5" to "95" preferably. Attached to the check C, so as to be detachable therefrom by means of a perforated line *f* or otherwise, is a second check D having on its front face a lined space one space, *d*, for numerals indicating dollars, preferably from "1" to "9," and corresponding to the space *c* and the numerals of said space in the check C and the other two, *d'*, of which are each provided with numerals indicating cents, preferably from "5" to "95," corresponding to the lines *c'* and numerals thereof on the check C, except that the numerals on the check D are reversely printed in comparison with the numerals on the check C, so that by folding the check D below or underneath the check C the punching of a numeral in the check C will punch a corresponding numeral in the check D, thereby simultaneously punching the same amount from both checks.

The face of the main or body portion of the card or bill of fare and each of the detachable checks have printed thereon a numeral or numerals indicating the number of the menu-card or bill of fare, it being understood that the cards or bills of fare are to be consecutively numbered for use, and the front of the body or main portion of the card or bill of fare can have imprinted thereon the name of the hotel, restaurant, steamboat, or railroad-company or other party or parties issuing the card or bill of fare. At the top of the card or bill of fare or otherwise thereon can be imprinted an instruction-line for the guest to indicate the article or articles ordered by a cross or other defining mark, and also, if so desired, the face of the body or main portion of the card or bill of fare may have imprinted thereon a notice to the effect that a separate check must be issued to each customer, with such other information as may be desired to impart to the customer. The face or front of the main portion or body of the card or bill of fare and both of the checks can have imprinted thereon numbers, prefixed by the words "Waiter's No.," so as to designate the waiter who takes the order. The check detachable from the main or body portion of the card or bill of fare is intended as the guest's pay-check and receipt for the meal and is to be punched by the proper party to indicate the amount due for the meal, and this pay-check and receipt should correspond with the amount of the customer's order as denoted on the body or main portion of the card or bill of fare by the indicating-marks made by the customer for the articles ordered and the punches in the amount-column for the articles ordered, with the prices therefor. This pay-check and receipt is to be torn off and given to the customer when the bill is paid. The check D constitutes what may properly be termed the "meal-check," indicating that a meal has been served thereon, and this meal-check D is to be punched with the guest's pay-check and receipt and after being so punched is to be torn off and deposited in a designated place of deposit—such, for instance, as the cook's box—which is provided for that purpose.

In use the consecutively-numbered menu-cards or bills of fare are given out in their order to the waiter, who hands each guest upon whom he waits one of the consecutively-numbered cards or bills of fare. The guest, glancing over the articles, selects therefrom such as are desired and indicates the selection by placing a mark in the circle or other inclosed space. The waiter takes the marked card or bill of fare to the kitchen or other place of supply where the articles designated are served, and when the order has been filled by the man in charge of the eatables the amount thereof is punched out on the body of the card or bill of fare by a person authorized so to do, such as a manager of a restaurant or a conductor on a dining-car, and at the same time the party punching folds the meal-check beneath the guest's pay-check and receipt and simultaneously punches both of the checks for an amount equal to the total amount of the order. The meal-check is to be torn off and deposited in the box or other receptacle therefor, and the guest's pay-check and receipt is to be torn off and handed to the guest when the amount thereof is paid, and the main or body portion of the menu-card or bill of fare becomes a check for the owner or company issuing the cards, by which, in connection with the meal-check D torn off and deposited, a positive tab or register is had of the articles served and the pay received therefor.

Among some of the advantages pertaining to the combined menu-card and checks of the present invention may be mentioned that by the use thereof the double expense of printing separate menu-cards or bills of fare and separate checks is saved. It enables guests to clearly indicate the articles wanted without the necessity of writing out the same, which in some places and under some conditions it is impracticable to do and have the writing perfectly legible. The guest has simply to indicate by a mark what article or articles are desired, and in this manner confusion and annoyance are avoided, as the articles are printed in full and can be readily selected and marked. As the articles marked by the guest must be punched out, it is practically impossible for the waiter or any one else to manipulate the checks. It is impossible for a manager, conductor, or other party to collect money and keep the same by marking the card or bill of fare void, as the check for the payment must be torn off, as well as the check for the kitchen or pantry, and with the checks torn off notice is given that the card has been used, and all voided cards must be turned in with unpunched receipts or checks attached. The marking of the article by the guest insures a correct register of the articles served and also enables the articles to be readily tabulated and a closer watch kept on the supplies. It will be impossible for a guest to claim that certain articles were not ordered, as the mark made by the guest, together with the punches on the card or bill of fare, will show just what articles were ordered, and with the menu-cards or bills of fare of this invention quicker and better service can be obtained, as a waiter can be attending to the wants of one guest or passenger while another is marking out the order which it is desired to have served.

What we regard as new, and desire to secure by Letters Patent, is—

1. A combined menu-card and meal and pay check consisting of the main or body portion having on its front face a bill of fare with an inclosed blank space before each article for marking or indicating therein the selected article and a column having therein figures corresponding to the prices of the articles on the bill of fare, a combined pay-check and receipt in one and having thereon appropriately-designated numerals for dollars and numerals for cents and detachably connected with the body or main portion of the card, and a meal-check having thereon appropriately-designated numerals for dollars and appropriately-designated numerals for cents and detachably connected with the combined pay-check and receipt, the body of the card the combined pay-check and receipt and the meal-check each having a designating character for the waiter, substantially as described.

2. A combined menu-card and meal and pay check, consisting of a main or body portion having on its printed face a bill of fare with an inclosed blank space before each article for marking or indicating therein the selected article, and a column having therein figures corresponding to the articles on the bill of fare with the figures of the column and the articles of a corresponding price transversely in line, a combined pay-check and receipt in one and having thereon an appropriately-designated row of numerals for dollars and two appropriately-designated rows of numerals for cents and detachably connected with the body or main portion of the card, and a meal-check having thereon an appropriately-designated row of numerals for dollars and two appropriately-designated rows of numerals for cents and detachably connected with the combined pay-check and receipt and having its numerals reversely arranged to the numerals on the combined pay-check and receipt for folding the meal-check under the combined pay-check and receipt to punch the checks simultaneously for corresponding amounts, substantially as described.

3. A combined menu-card and meal and pay check, consisting of a main or body portion having on its printed face a bill of fare with an inclosed blank space before each article for marking or indicating therein the selected article, and a column having therein figures corresponding to the articles on the bill of fare with the figures of the column and the articles of a corresponding price transversely in line, a combined pay-check and receipt in one and having thereon an appropriately-designated row of numerals for dollars and two appropriately-designated rows of numerals for cents and detachably connected with the body or main portion of the card, and a meal-check having thereon an appropriately-designated row of numerals for dollars and two appropriately-designated rows of numerals for cents and detachably connected with the combined pay-check and receipt and having its numerals reversely arranged to the numerals on the combined pay-check and receipt for folding the meal-check under the combined pay-check and receipt to punch the checks simultaneously for corresponding amounts, the body of the card the combined pay-check and receipt and the meal-check, each having a designating character for the waiter, substantially as described.

ARTHUR E. WHITE.
JOHN J. EVANS.

Witnesses:
THOMAS A. BANNING,
OSCAR W. BOND.